US010440097B1

(12) United States Patent
Raza et al.

(10) Patent No.: US 10,440,097 B1
(45) Date of Patent: Oct. 8, 2019

(54) PROFILE BASED STREAMING

(75) Inventors: Muhammad Asif Raza, McDonough, GA (US); Julius Bert Bagley, Lawrenceville, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 744 days.

(21) Appl. No.: 13/151,103

(22) Filed: Jun. 1, 2011

Related U.S. Application Data

(60) Provisional application No. 61/357,423, filed on Jun. 22, 2010.

(51) Int. Cl.
*H04L 29/08* (2006.01)
*H04L 12/28* (2006.01)
*H04L 29/06* (2006.01)

(52) U.S. Cl.
CPC .......... *H04L 67/06* (2013.01); *H04L 12/2812* (2013.01); *H04L 67/40* (2013.01)

(58) Field of Classification Search
CPC ...... H04L 12/2812; H04L 67/06; H04L 67/40
USPC ............................... 726/26–31; 725/23, 131
See application file for complete search history.

(56) References Cited

U.S. PATENT DOCUMENTS

| 8,478,236 | B2 * | 7/2013 | Chen et al. .................. 455/410 |
| 2005/0169473 | A1 * | 8/2005 | Candelore ............ A01K 11/008 380/239 |
| 2008/0170528 | A1 * | 7/2008 | Bosch et al. .................. 370/312 |
| 2008/0207182 | A1 * | 8/2008 | Maharajh et al. ......... 455/414.1 |
| 2009/0228600 | A1 * | 9/2009 | MacFarlane et al. ........ 709/231 |
| 2009/0282436 | A1 * | 11/2009 | Perry ............................. 725/39 |
| 2010/0151822 | A1 * | 6/2010 | Medvinsky et al. .......... 455/410 |
| 2010/0250704 | A1 * | 9/2010 | Kittel ....................... G06F 21/10 709/219 |
| 2011/0055933 | A1 * | 3/2011 | Ishiguro .................. G06F 21/10 726/27 |

* cited by examiner

*Primary Examiner* — Farid Homayounmehr
*Assistant Examiner* — Suman Debnath
(74) *Attorney, Agent, or Firm* — Merchant & Gould

(57) ABSTRACT

Content is provided from a source device to a target device using a trusted domain. A customer calls customer service of a service provider to provide information for registering a target device. The service provider enters the information in a billing system. The billing system provides the data to a profile management server. The service provider instructs the customer to install an application on the target device and the content source device. The profile of the target device is provided to the content source device. The customer connects with the content source device to establish a trusted network. Then, after receiving a request for content from the target device, the content source device decrypts the requested content to remove existing encryption, transcodes the requested content according to the profile of the target device and streams the content to the target device.

31 Claims, 6 Drawing Sheets

PROFILE BASED STREAMING

CROSS REFERENCE TO RELATED APPLICATIONS

The present application claims priority to U.S. Provisional Patent Application No. 61/357,423 filed Jun. 22, 2010, the disclosure of which is hereby incorporated by reference in its entirety.

BACKGROUND

In today's multimedia environment most of the multimedia content is transmitted in high quality and high bit rate form. This method of delivery and high quality ensures that the viewers get the best programming experience possible. For example, a typical MPEG-2 High Definition 1080i video stream takes around 14 Mbps of dedicated bit rate to ensure good video quality to the end user. This content is streamed to the user on MSO's dedicated transport infrastructure that is owned by the MSO to ensure reliable delivery with quality of service.

However, such is not the case when the consumer wants to share the recorded content on the DVR set-top device or any other storage medium attached to consumer's cable set-top box. The problem occurs due to a limited and finite upstream internet bandwidth that most users subscribe to. A typical upstream internet bandwidth that a home user has is around 1.5-2 Mbps for upstream to upload and communicate digitally. Therefore, it becomes entirely impossible to stream local HD content to a mobile device (cell phone, laptop) due to bandwidth constraints.

It is with respect to these and other considerations that the present invention has been made.

SUMMARY

To overcome the limitations described above, and to overcome other limitations that will become apparent upon reading and understanding the present specification, embodiments for providing profile based streaming of content are disclosed.

The above-described problems are solved by providing a mechanism where a user registers the connected devices in the network with the service provider. For example, if the user wants to stream content to a mobile device, then the user must register that device with the service provider. The mobile device provides a unique identifier and a preferred viewing profile. This profile is saved with the consumer account creating a repository of the registered devices on the account along with preferred viewing profile. This profile is then also transferred to the consumer terminal equipment, such as DVR or set-top box, so that the server knows which devices to stream content to thereby creating a trusted virtual network that is agnostic to geographical boundaries.

An embodiment includes method for rendering content. The method includes registering a mobile device for rendering content with a service provider according to a provided preferred content delivery profile, establishing a direct connection with a content source device having content for streaming to the mobile device as part of a trusted network, accessing the content source device to select content for streaming to the mobile device, receiving, from the content source device, the selected content configured according to the preferred content delivery profile.

In another embodiment, a mobile device is disclosed. The mobile device includes memory for storing data, and a processor, coupled to the memory, the processor configured to render content received from a content source device in a trusted network, the processor implementing a local identity management client utility for managing an identity associated with the processor, for registering with a service provider and for establishing streaming of content according to a preferred content delivery profile.

In another embodiment, a method for providing personalized content to a target device through a trusted network is disclosed. The method includes receiving registration information for a target device including a preferred content delivery profile for the target device, entering the registration information in a billing system, generating profile information associated with the target device using the registration information, storing the profile information in a profile management system, and providing, to a content source device, the profile information for the target device including a preferred content delivery profile for the target device.

In another embodiment, a service provider system is disclosed. The service provider system includes a customer service system for receiving registration requests from a target device and gather registration information associated with the target device, including a preferred content delivery profile for the target device, a billing system, coupled to the customer service system, for receiving the registration information associated with the target device, an application repository for storing an application for managing a local identity of the target device, the application repository providing the application for managing the local identity of the target device to the target device to enable the target device to have access to a trusted network including a content source, and a profile manager for receiving the registration information and generating profile information associated with the target device, wherein the profile manager provides the profile information to the content source device for configuring content selected by the target device for streaming to the target device according to the preferred content delivery profile of the target device.

In another embodiment, a method for providing content to a device according to a profile of the device is disclosed. The method includes receiving, from a profile management system, registration information for a target device including a preferred content delivery profile for the target device, upon receiving a request from the target device, performing authentication of the target device, upon authentication of the target device, establishing a connection within a trusted network to the target device, exchanging specific identifiers, DRM profiles and preferred resolution information from the target device, receiving a content streaming request from the target device, upon receiving streaming request, decrypting content stored at the content source device, transcoding the requested content into a format according to the preferred content delivery profile of the target device and encapsulating the transcoded content with a DRM wrapper, and streaming to the target device content configured according to the preferred content delivery profile.

In another embodiment, a content source device for providing content to a device according to a profile of the device is disclosed. The content source device includes memory for storing data including content, and a processor, coupled to the memory, the processor receiving a request for access to the stored content from a target device, receiving, from a profile management system, registration information for the target device including a preferred content delivery profile for the target device and performing authentication of the target device using the received profile information, the processor, upon authentication of the target device, establishing a connection to the target device within a trusted network, decrypting content requested by the target device transcoding the requested content into a format according to the preferred content delivery profile of the target device and encapsulating the transcoded content with a DRM wrapper and streaming content configured according to the preferred content delivery profile to the target device.

In another embodiment, a method of providing content from a source device to a target device using a trusted domain is disclosed. The method includes registering a target device to create a preferred profile for delivery of content to the target device and for establishing a trusted domain between the target device and a source device, requesting, by the target device, content from the source device, initiate an authentication process at the source device, accessing, by the source device, a profile manager for identifying the target device, for authenticating the target device, and for identifying a delivery profile preferred by the requesting target device, providing, to the source device by the profile manager, authentication of the target device and profile information for delivering the requested content to the target device, preparing, by the source device, the requested content for delivery to the target device according to the profile information provided by the profile manager, and streaming the requested content to the target device using a direct connection according to the preferred profile of the target device.

In another embodiment a computer readable medium including executable instructions which, when executed by a processor, streams content from a source device to a target device using a trusted domain, is disclosed. The computer readable medium includes instructions executable by the processor to register a target device to create a preferred profile for delivery of content to the target device and for establishing a trusted domain between the target device and a source device, request, by the target device, content from the source device, initiate an authentication process at the source device, access, by the source device, a profile manager for identifying the target device, for authenticating the target device, and for identifying a delivery profile preferred by the requesting target device, provide, to the source device by the profile manager, authentication of the target device and profile information for delivering the requested content to the target device, prepare, by the source device, the requested content for delivery to the target device according to the profile information provided by the profile manager, and stream the requested content to the target device using a direct connection according to the preferred profile of the target device.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

DETAILED DESCRIPTION

Embodiments of the present invention are directed to providing a client/server based identity mechanism that can be used to address this significant and yet not addressed problem. A user registers the devices in a network to establish a trusted network domain. Once the device is registered on the trusted network, the content may be delivered to the mobile device with a desired quality of service applicable to the registered device.

Figure 1:
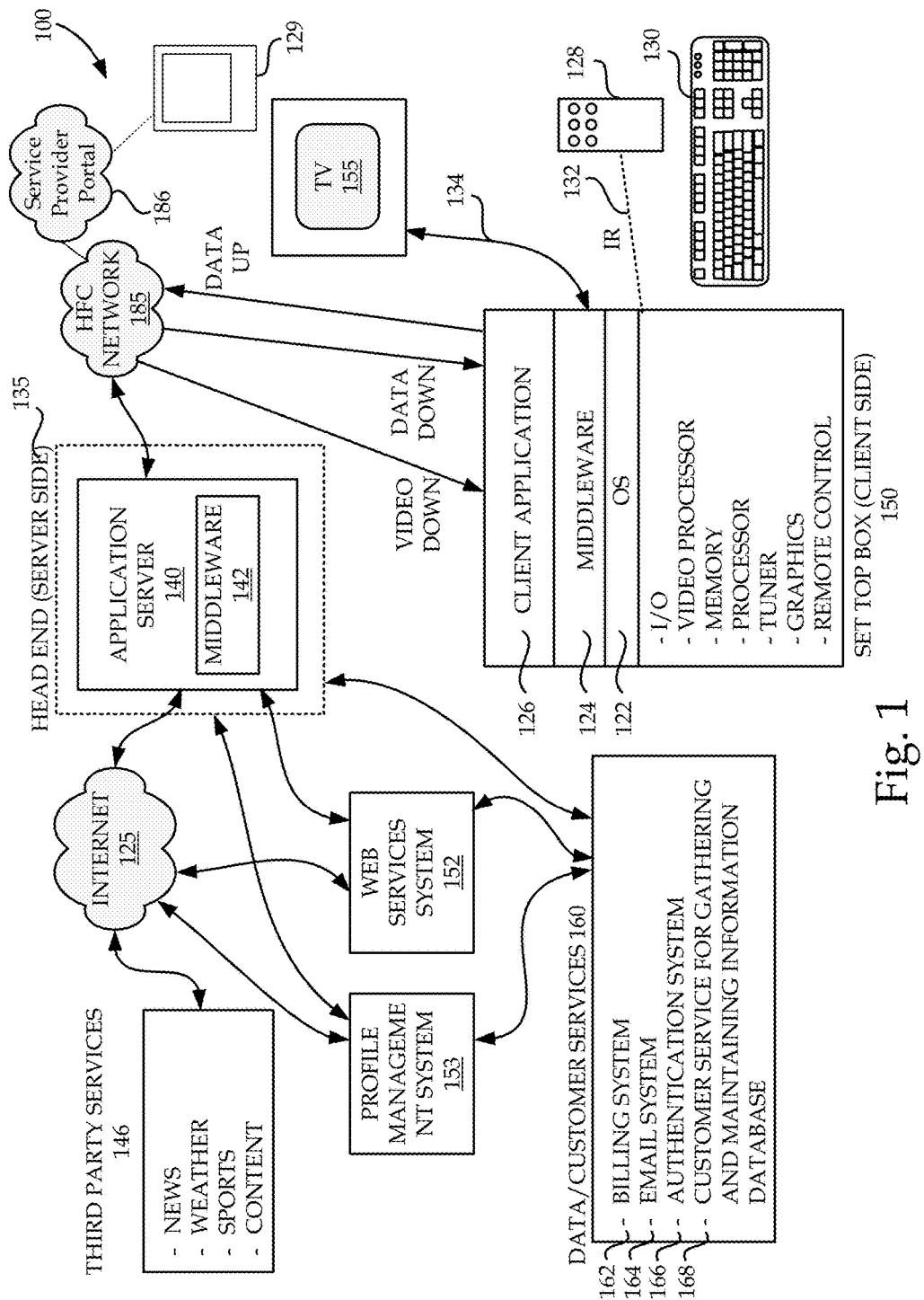
FIG. 1 is a simplified block diagram illustrating a cable television/services system (CATV) architecture providing an operating environment according to an embodiment.

FIG. 1 is a simplified block diagram illustrating a cable television/services system (CATV) architecture 100 providing an operating environment according to an embodiment. Referring now to FIG. 1, digital and analog video programming, information content and interactive television services are provided via a hybrid fiber coax (HFC) network 185 to a television set 155 for consumption by a cable television/services system customer. As is known to those skilled in the art, HFC networks 185 combine both optical fiber and coaxial cable lines. Typically, optical fiber runs from the cable head end 135 to neighborhoods of 500 to 2,000 customers. Coaxial cable runs from the optical fiber feeders to each customer. According to embodiments of the present invention, the functionality of the HFC network 185 allows for efficient bidirectional data flow between the client-side set-top box 150 and the server-side application server 140 of the present invention.

According to embodiments of the present invention, the CATV system 100 is in the form of a distributed client-server computing system for providing video and data flow across the HFC network 185 between server-side services providers (e.g., cable television/services providers) via a server-side (backend) head end 135 and a client-side customer via a client-side set-top box (STB) functionally connected to a customer receiving device, such as the television set 155. As is understood by those skilled in the art, modern CATV systems 100 may provide a variety of services across the HFC network 185 including traditional digital and analog video programming, telephone services, high speed Internet access, video-on-demand, and information services.

On the client side of the CATV system 100, digital and analog video programming and digital and analog data are provided to the customer television set 155 via the set-top box (STB) 150. Interactive television services that allow a customer to input data to the CATV system 100 likewise are provided by the STB 150. As illustrated in FIG. 1, the STB 150 is a multipurpose computing device having a computer processor, memory and an input/output mechanism. The input/output mechanism of a STB 150 receives input from server-side processes via the HFC network 185 and from customers via input devices such as the remote control device 128 and the keyboard 130. The remote control device 128 and the keyboard 130 may communicate with the STB 150 via a suitable communication transport such as the infrared connection 132. The STB 150 also includes a video processor for processing and providing digital and analog video signaling to the television set 155 via a cable communication transport 134. A multi-channel tuner is provided for processing video and data to and from the STB 150 and the server-side head end system 135, described below.

The STB 150 may also include an operating system 122 for directing the functions of the STB 150 in conjunction with a variety of client applications 126. For example, if a client application 126 requires a news flash from a third-party news source to be displayed on the television 155, the operating system 122 may cause the graphics functionality and video processor of the STB 150, for example, to output the news flash to the television 155 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 150. According to one embodiment of the present invention, the middleware layer 142 of the server-side application server and the middleware layer 124 of the client-side STB 150 format data passed between the client side and server side according to the Extensible Markup Language (XML). Although some embodiments described in this specification are oriented to middleware installed and executed on a STB 150, those skilled in the art will recognize that alternative embodiments may be implemented as firmware or as hardware are well within the scope of the present invention.

The set-top box 150 passes digital and analog video and data signaling to the television 155 via a one-way communication transport 134. The STB 150 may receive video and data from the server side of the CATV system 100 via the HFC network 185 through a video/data downlink and data via a data downlink. The STB 150 may transmit data from the client side of the CATV system 100 to the server side of the CATV system 100 via the HFC network 185 via one data uplink. The video/data downlink is an "in band" downlink that allows for digital and analog video and data signaling from the server side of the CATV system 100 through the HFC network 185 to the set-top box 150 for use by the STB 150 and for distribution to the television set 155.

The data downlink and the data uplink, illustrated in FIG. 1, between the HFC network 185 and the set-top box 150 comprise "out of band" data links. As is understood by those skilled in the art, the "out of band" frequency range generally operates at a lower frequency than the "in band" signaling. However, embodiments of the invention need not be so limited. Nevertheless, data flow between the client-side set-top box 150 and the server-side application server 140 is typically passed through the "out of band" data links. Alternatively, an "in band" data carousel may be positioned in an "in band" channel into which a data feed may be processed from the server-side application server 140 through the HFC network 185 to the client-side STB 150. Operation of data transport between components of the CATV system 100, described with reference to FIG. 1, is well known to those skilled in the art.

Referring still to FIG. 1, the head end 135 of the CATV system 100 is positioned on the server side of the CATV system and includes hardware and software systems responsible for originating and managing content for distributing through the HFC network 185 to client-side STBs 150 for presentation to customers via televisions 155. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 150 via the HFC network 185. As described above with reference to the set-top box 150, the application server 140 includes a middleware layer 142 for processing and preparing data from the head end of the CATV system 100 for receipt and use by the client-side set-top box 150. For example, the application server 140 via the middleware layer 142 may obtain data from third-party services 140 via the Internet 125 for transmitting to a customer through the HFC network 185 and the set-top box 150. For example, a weather report from a third-party weather service may be downloaded by the application server via the Internet 125. When the application server 140 receives the downloaded weather report, the middleware layer 142 may be utilized to format the weather report for receipt and use by the set-top box 150. According to one embodiment of the present invention, data obtained and managed by the middleware layer 142 of the application server 140 may be formatted according to the Extensible Markup Language and passed to the set-top box 150 through the HFC network 185 where the XML-formatted data may be utilized by a client application 126 in concert with the middleware layer 124, as described above. As should be appreciated by those skilled in the art, a variety of third-party services data, including news data, weather data, sports data and other information content, may be obtained by the application server 140 via distributed computing environments such as the Internet 125 for provision to customers via the HFC network 185 and the set-top box 150. According to an embodiment of the present invention, digital video recording functionality may be located remotely on the head end (server side) 135 and called upon by a client set-top box 150.

According to embodiments of the present invention, the application server 140 may obtain customer profile data from services provider data services 160 for preparing a customer profile that may be utilized by the set-top box 150 in providing certain content to the customer and for pre-populating product/services order forms and customer lead generation forms.

As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services.

The customer information database 168 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address.

As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols Referring still to FIG. 1, a web services system 152 is illustrated between the application server 140 and the data services 160. According to embodiments of the present invention, the web services system 152 serves as a collection point for data requested from each of the disparate data services systems comprising the data services 160. When the application server 140 requires customer profile data from one or more of the data services 160 for preparation or update of a customer profile, the application server 140 may pass a data query to the web services system 152. The web services system may then formulate a data query to each of the available data services systems for obtaining any available data for a given customer as identified by a set-top box identification associated with the customer. In this manner, the web services system 152 may serve as an abstraction layer between the various data services systems and the application server 140. That is, the application server 140 is not required to communicate with the disparate data services systems, nor is the application server 140 required to understand the data structures or data types utilized by the disparate data services systems. The web services system 152 may also be operative to communicate with each of the disparate data services systems for obtaining necessary customer profile data. The customer profile data obtained by the web services system can be assembled and returned to the application server 140 for ultimate processing via the middleware layer 142, as described above.

In FIG. 1, a customer may contact customer service 160 to register devices with the network. Customer service 168 obtains all the information (MAC, model, DRM/encryption profile etc.) needed for registration of a device, such as a mobile device 186 or in-home device 155. Such information may also include unique identifiers about the device 186, 155 that may be used to create a customer profile, e.g., identification of the mobile device 186, the optimal resolution, the bit rate, etc. This information may be provided to the billing system 162. The billing system 162 may push such information to profile management system 153. FIG. 1 also shows that the service provider provides a portal 186 that allows a customer to access for entering relevant information to register the device 129 thereby providing the information to customer service 168, billing system 162 and profile management system 153.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer readable media may be a computer storage media readable by a computer system and encoding a computer program of instructions for executing a computer process. The computer program product may be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can provide the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

Figure 2:
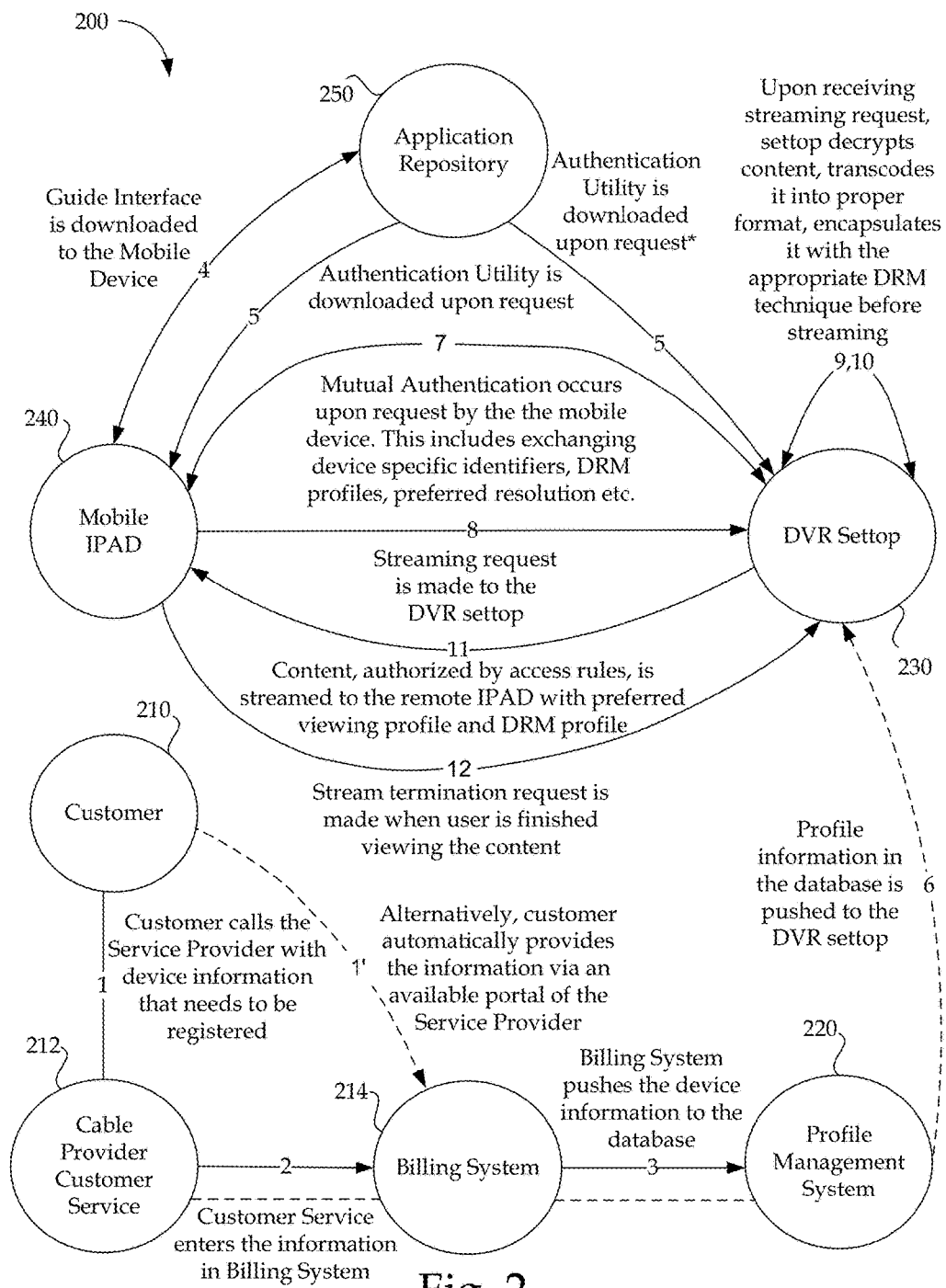
FIG. 2 is a simplified block diagram of a use case scenario utilizing an embodiment of the present invention.

FIG. 2 is a simplified block diagram of a use case scenario utilizing an embodiment of the present invention. In FIG. 2, a customer 210 purchases a mobile device 240 and wants to stream content while mobile. The customer 210 contacts the customer service of the service provider 212 to register with the network. The customer care provider of the service provider 212 obtains all the information needed for registration of the device 240 (MAC, model, DRM/encryption profile etc.). Such information may also include unique identifiers about the device 240 that may be used to create a customer profile, e.g., identification of the mobile device 240, the optimal resolution, the bit rate, etc. The service provider 212 enters and stores this information in the billing system 214 so that such information may be pushed to profile management system 220. The registration of the device can also happen without service provider's customer service's manual intervention if the service provider implements a portal for the customer to enter all the relevant information to register the device. For example, the information may be stored in one of the billing interfaces and associated with that person's account. The billing system 214 can then push the data to a profile management system 220.

The customer 210 may then install a guide navigation interface and an application for managing the identity of the mobile device 240, i.e., a registration utility. In FIG. 2, a customer 210 is shown downloading a local identity management utility from an application repository 250. A similar application is also installed on a home server 230. The management utility may already exist on the customer's home server 230 if the customer 210 is already a subscriber of the service provider 212. While the example described herein is presented using a pull process, the management utility may also be obtained through a push process initiated by the service provider 212.

Once the management utility has been installed on both the server 230 and the client device 240, the client device 240 may initiate contact with the server 230. This contact may be through an IP address via a specific URL or location. Information in the server registry and the client registry are synchronized using information provided from a system, such as a billing system 214. The information from the billing system 214 identifies the addition of the new device 240 to the server 230 so that the server 230 knows that a trusted device 240 has been added to the network. By the same virtue, the billing system 214 also keeps track of the devices that have been deleted from the system. The server 230 may be a set-top box (STB), a DVR/STB 230 or other computing device. The server/DVR 230 will act as a source device 230 to the target device 240 (i.e., the new mobile device 240 added to the trusted network).

When the target device 240 registers with the trusted network, the server 230 performs authentication to verify access rights of the target device 240. Once the target device 240 is registered, the target device 240 may request any content that is authorized by rules defined by the subscriber. For example, a listing of all DVR content or limited DVR content, e.g., based on the local parental control or privacy settings and user specific settings that are also managed by the profile manager, or content located in an attached storage medium may be provided to the target device 240. For example, the local parental control may be used to limit content based on the user's login information or through parental control settings and other rules associated with a particular identified user. Thereafter, any authorized stream request may be made by the target device 240. Those skilled in the art will recognize that the system is not meant to be limited to control by a "parental." Rather, control by a parent is used merely as one example, and as such the system may be controlled by any person having ultimate authority.

The server 230 receives the streaming request from the target device 240, and confirms the authenticity of the requesting target device 240 by matching information associated with the target device 240 with the local stored database that includes preferable viewing resolution and DRM profile of the target device 240.

The server 230 then, based on the profile takes the recorded content, decrypts the content to remove the traditional encryption depending on the traditional conditional access vendor, transcodes it to the correct resolution and puts the correct DRM wrapper around it before streaming.

The target device 240 receives the streaming content from the server 230, unwraps the DRM and starts playing the content. When the user decides to stop viewing the content, playback is exited. This also initiates a termination message that is sent to the server 230. Upon receiving the termination message, the server 230 terminates the streaming of the content in order to save bandwidth and local CPU resources.

In the case where the DRM profile does not match, the customer 210 can dynamically request an appropriate DRM encapsulation from the server 230 by sending the message to the server 230. The server 230 then puts the correct DRM encapsulation around the content and streams the content to the target device 240.

Any additional devices are registered and operate according to the process described above. In addition, since the two-way connection and communication has been established in the above environment, the client target device 240 can also share content to the server 230 the same way it was transferred to the target device 240 from the server 230.

The target device 240 is further able to use the reverse path back to access the Internet to locate other companies, such as telephone companies. A well-known address or other locating process is used to make the initial connection, and then the device 240 can establish a direct connection through the IP network.

Figure 3:
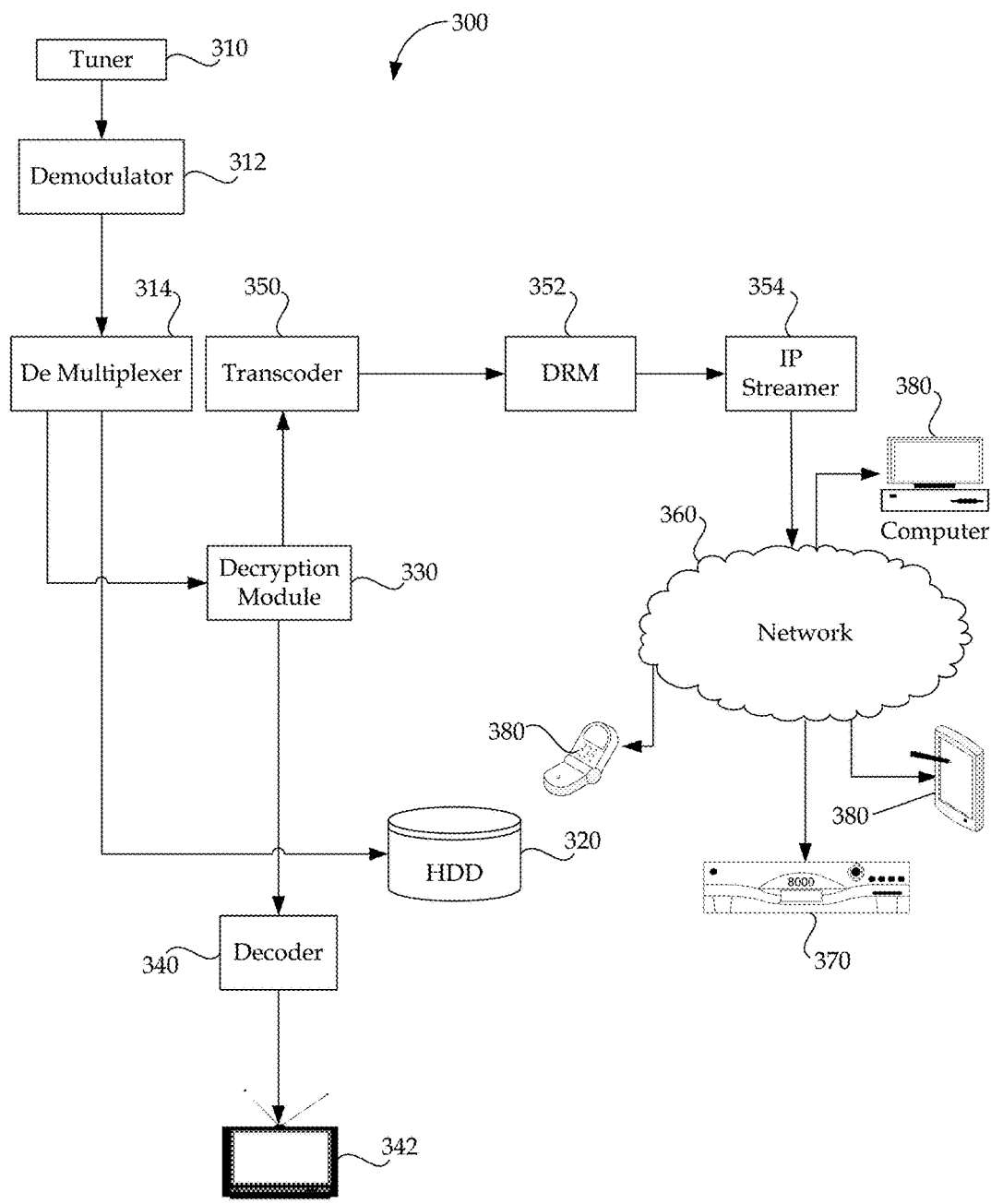
FIG. 3 is a simplified block diagram illustrating flow in a network for providing content to subscribers.

In FIG. 3, a server includes a tuner 310 to select a single downstream channel from the plurality of downstream channels for recording and a demodulator 312 extracts the original content from the modulated carrier wave and provide the demodulated content to a demultiplexer 314. The MPEG transport stream may then be demultiplexed into data streams containing either MPEG data or digitized DOCSIS data. The MPEG data is demultiplexed from the same MPEG transport stream that carries the DOCSIS data by the demultiplexer 314. The MPEG data may then be decrypted by a decryption module 330 and transmitted to video decoder 340 for transmission to television 342. The MPEG data may also be recorded at a storage device 320.

The decrypted content may be provided from the demultiplexer 314 to a transcoder 350 to prepare the content for streaming. Digital rights management (DRM) 352 is applied to the content and the content is streamed over a network 360 by an IP streamer 354. The content may then be received by devices 380 through the network 360. However, the transcoding and the application of DRM 352 are performed without regard to the capabilities of the target devices 380 or the desires of the user.

Figure 4:
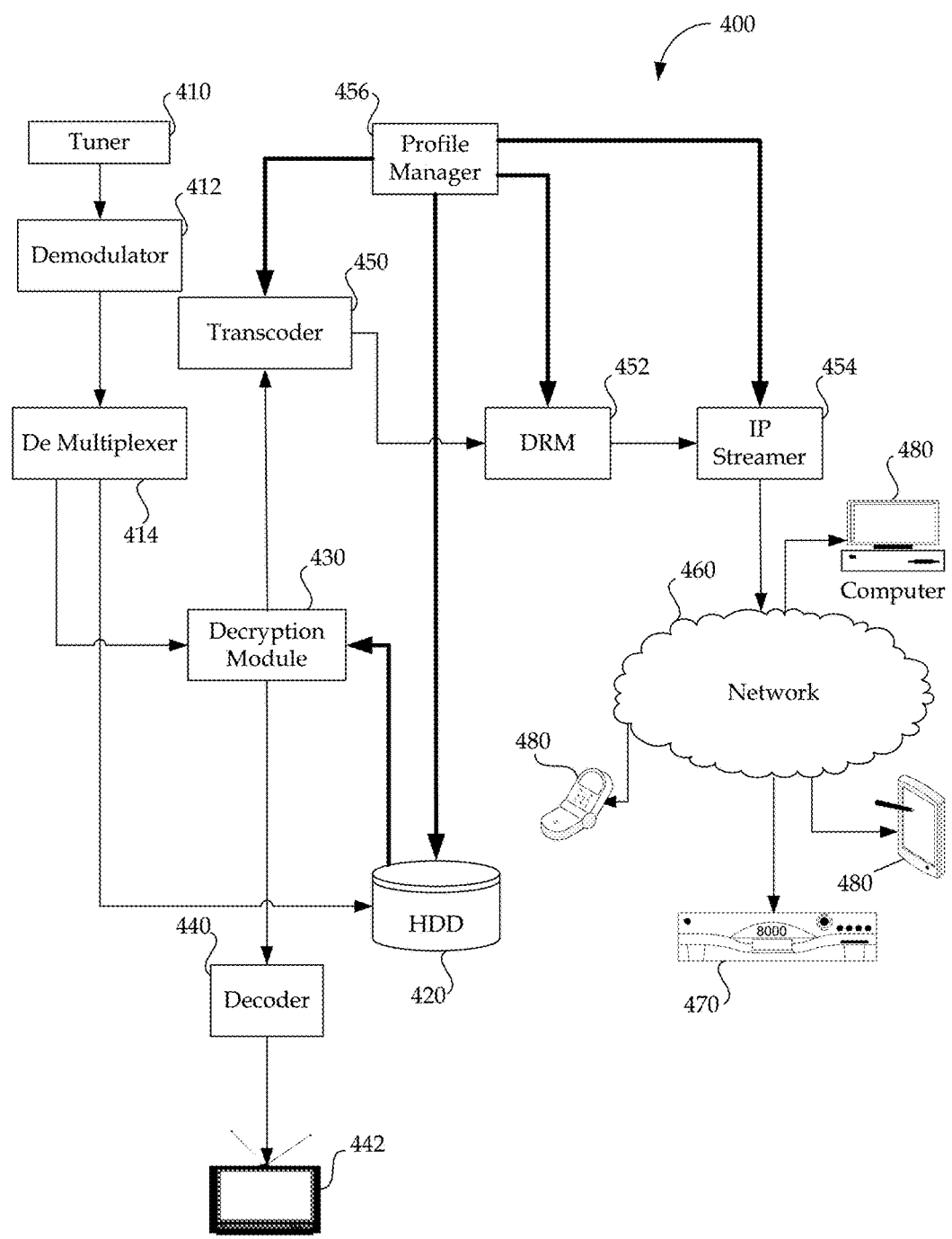
FIG. 4 is a simplified block diagram illustrating a profile based flow.

FIG. 4 is a simplified block diagram illustrating a profile based flow according to an embodiment. In FIG. 4, a profile manager 456 has been added. Similar to the system 300 shown in FIG. 3, system 400 shown in FIG. 4 also includes tuner 410, demodulator 412, demultiplexer 414, decryption module 430, storage device 420, decoder 440, TV 442, transcoder 450, DRM 452, IP streamer 454, devices 480 and network 460. The profile manager 456 stores the profile for different client devices. Thus, the system 400 shown in FIG. 4 further includes a profile manager 456 that controls the transcoding 450 and DRM 452 to ensure that the content is configured as desired for receipt by the target devices 480.

The profile manager 456 provides the storage device 420 information for providing the recorded content to the decryption module 430. The recorded content is decrypted to remove the traditional encryption, transcoded to the correct resolution and encapsulated with the correct DRM wrapper before streaming. The profile manager 456 communicates with the IP streamer 454 to coordinate delivery of content to the target devices 380 through network 460.

Figure 5:
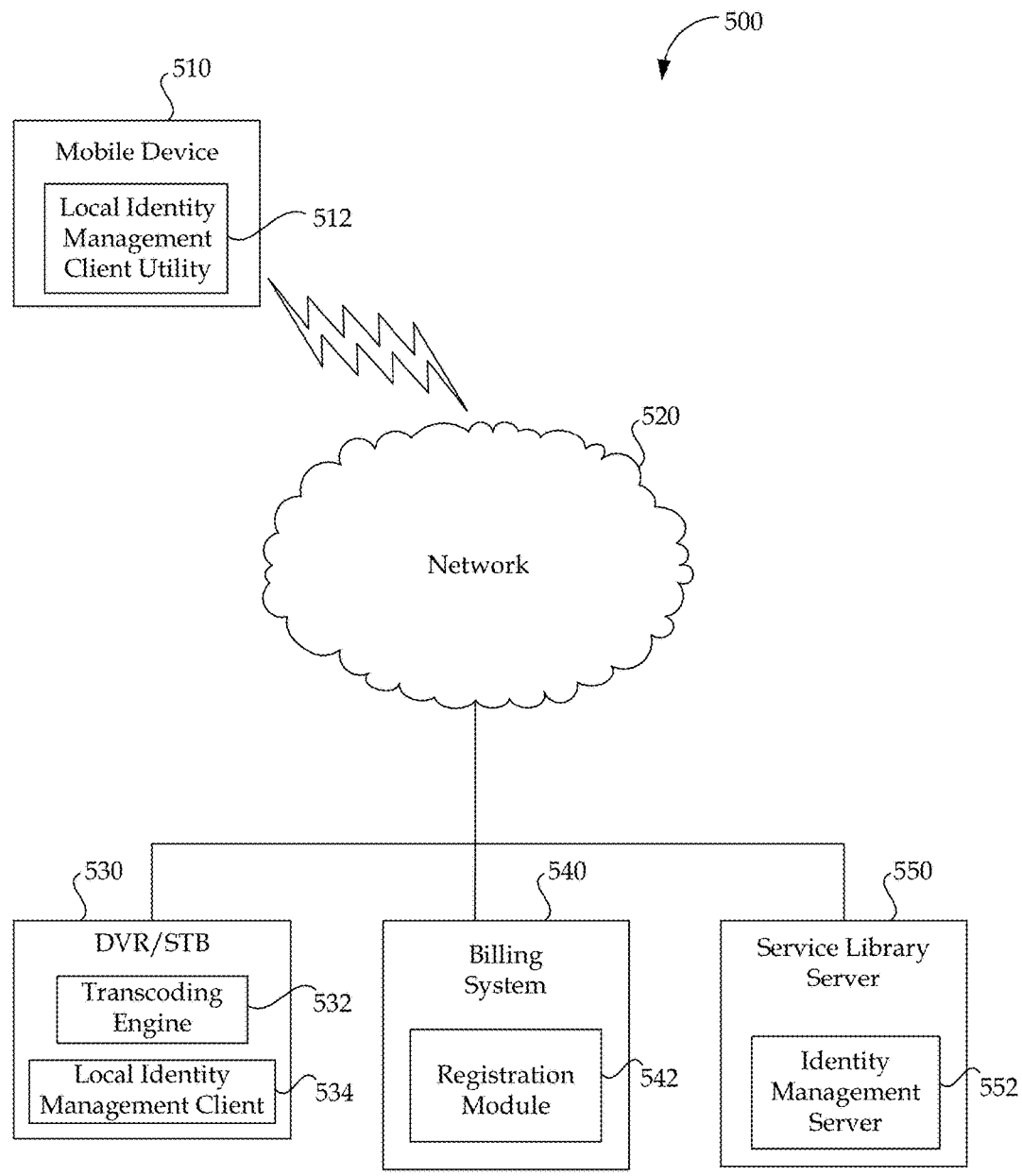
FIG. 5 is a simplified system block diagram illustrating the delivery of content to a mobile device according to an embodiment.

FIG. 5 is a simplified system block diagram 500 illustrating the delivery of content to a mobile device 510 according to an embodiment. In FIG. 5, a mobile device 510 is shown having a local identity management client utility 512 that may also provide a guide navigation interface. The mobile device 510 communicates with a DVR/STB 530 through a network 520. Content is recorded on the DVR/STB 530. The DVR/STB 530 also includes a local identity management client 534 so that the DVR/STB 530 and the mobile device 510 operate within a trusted domain.

A billing system 540 may be configured to handle customer billing as well as supervising the registration of the mobile device 510 through the use of a registration module 542. As indicated above, the registration module 542 may maintain the profile information of the customer. The management of the identities of the mobile device 510 is provided by an identity management server 552. The identity management server 552 may be implemented in a service library server 550.

The mobile device 510 may initiate contact with the DVR/STB 530 using an IP address of the DVR/STB 530. The DVR/STB 530 provides a listing of all DVR content or content located in an attached storage medium to the mobile device 510. The DVR/STB 530 receives the streaming request from the mobile device 510, and confirms the authenticity of the requesting target device using information provided by the identity management server 552. The DVR/STB 530 then, based on the obtained profile, takes the recorded content, decrypts the content to remove the traditional encryption, transcodes the content using the transcoding engine 532 so that the content matches the requirements of the mobile device 510. The DVR/STB 530 also provides a DRM wrapper around the content before streaming the content to the mobile device 510.

Figure 6:
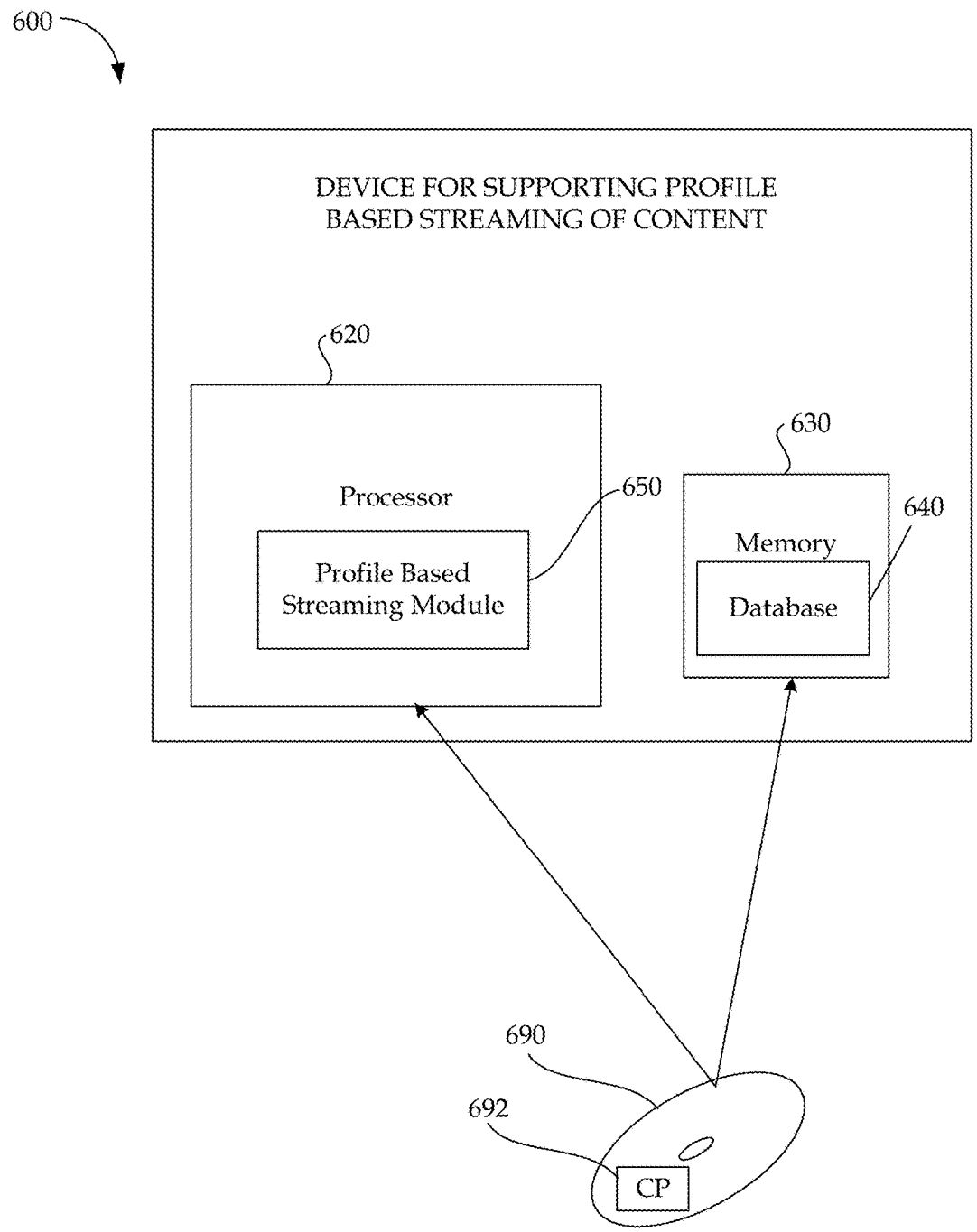
FIG. 6 illustrates a suitable computing environment for implementing profile based streaming of content as described above in FIGS. 1-5 according to an embodiment.

FIG. 6 illustrates a suitable computing environment 600 for implementing profile based streaming of content as described above in FIGS. 1-5 according to an embodiment. In FIG. 6, a device for supporting profile based streaming of content 600 includes a processor 620 and memory 630. Those skilled in the art will recognize that the device for supporting profile based streaming of content 600 may be a personal device of a user, a server such as a DVR, a STB or other terminal equipment or a system provider system. Embodiments may also be implemented in combination with other types of computer systems and program modules. Generally, program modules include routines, programs, components, data structures, and other types of structures that perform particular tasks or implement particular abstract data types.

By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that the invention may be practiced with other computer system configurations, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, it should be appreciated by those skilled in the art that computer-readable media can be any available media that can be accessed or utilized by a processing device, e.g., personal media device, cellphone, server or communications network provider infrastructure.

By way of further example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules.

It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 630 thus may store the computer-executable instructions that, when executed by processor 620, cause the processor 620 to implement a device for supporting profile based streaming of content 600 as illustrated above in FIGS. 1-5 according to an embodiment of the invention. A database 640 may be maintained in memory 630 to provide access to data maintained in memory 630. Profile based content streaming module 650 may also be configured to support functions involved in providing profile based streaming of content.

Accordingly, embodiments described above use the existing network components to provide visibility to the target devices when added to the trusted network. A small database is stored on the client target device with the decision and transcoding engine running on the server, i.e., the DVR/STB. The transcoding engine provides on-demand transcoding and streaming of the content so that multiple copies of the content are not required.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method for rendering content, comprising: registering a mobile device with a service provider according to a preferred content delivery profile, the preferred content delivery profile including an encryption information based on a digital rights management configuration, an optimal resolution, and a bit rate associated with the mobile device;
establishing a direct connection with a content source device having a plurality of content for streaming to the mobile device as part of a trusted network, wherein the plurality of content is stored in an encrypted state;
installing a guide interface at the mobile device to enable navigation through the plurality of content from the content source device; and
selecting content from the plurality of content for streaming to the mobile device, wherein the preferred content delivery profile is provided from the service provider to the content source device and wherein the content source device, based on the preferred content delivery profile, decrypts and encapsulates the selected content with a digital rights management wrapper using the encryption information to provide the selected content to the mobile device for streaming according to the preferred content delivery profile.

2. The method of claim 1, wherein registering the mobile device comprises contacting customer service of the service provider and providing information identifying a customer associated with the mobile device, the mobile device, and the preferred content delivery profile.

3. The method of claim 1, wherein registering the mobile device comprises accessing a portal, using the mobile device, to provide the service provider customer information and mobile device identifying information.

4. The method of claim 1, wherein registering the mobile device with the service provider according to the provided preferred content delivery profile further comprises providing a MAC address and a model number identifying the mobile device for streaming the selected content to the mobile device.

5. The method of claim 1, further comprising:
receiving at the mobile device a listing of content available for streaming to the mobile device.

6. The method of claim 1, wherein to receive the selected content at the mobile device, the mobile device is authenticated by the content source device, the authenticated mobile device and the content source device communicating using direct addressing and encryption.

7. The method of claim 1, wherein the selected content received at the mobile device is only content authorized through local parental control.

8. A mobile device, comprising:
a memory for storing data; and
a processor, coupled to the memory, the processor configured to render content received from a content source device that stores the content in an encrypted state in a trusted network, the processor implementing:
a local identity management client utility to:
manage an identity associated with the processor;
register the mobile device with a service provider; and
establish streaming of content from the content source device according to a preferred content delivery profile, the preferred content delivery profile including encryption information based on a digital rights management configuration, an optimal resolution, and a bit rate associated with the mobile device; and
a guide interface to navigate through the content from the content source device, wherein responsive to a selection of content for streaming to the mobile device, the content source device, based on the preferred content delivery profile, decrypts and encapsulates the selected content with a digital rights management wrapper using the encryption information to provide the selected content to the mobile device for streaming according to the preferred content delivery profile.

9. The mobile device of claim 8, wherein the processor establishes streaming of content by receiving only content authorized through local parental control.

10. The mobile device of claim 8, wherein the processor registers with the service provider by accessing a portal to provide customer information and mobile device identifying information to the service provider.

11. The mobile device of claim 8, wherein the processor registers with the service provider by contacting customer service of the service provider and by providing customer information and mobile device identifying information.

12. The mobile device of claim 8, wherein the processor registers with the service provider by providing a MAC address and a model number of the mobile device for receiving streamed content.

13. The mobile device of claim 8, wherein the processor accesses the content source device to select content for streaming and receives a listing of content available for streaming to the mobile device.

14. The mobile device of claim 8, wherein the processor registers with the content source device to form the trusted network by authenticating with the content source device and communicating with the content source device using direct addressing and encryption.

15. A method for providing personalized content to a target device through a trusted network, comprising: receiving, at a service provider, registration information for a target device, the registration information including a preferred content delivery profile for the target device that comprises encryption information based on a digital rights management configuration, an optimal resolution, and a bit rate associated with the target device;

entering the registration information in a billing system;

generating profile information associated with the target device using the registration information;

storing the profile information in a profile management system; and in response to the target device selecting content for streaming from a content source device that stores content in an encrypted state, providing, the profile information for the target device including the preferred content delivery profile to the content source device and wherein the content source device, based on the preferred content delivery profile, decrypts and encapsulates the selected content with a digital rights management wrapper using the encryption information to provide the selected content to the target device for streaming according to the preferred content delivery profile.

16. The method of claim 15, further comprising providing instructions to the target device for installing a guide navigation interface on the target device and for installing a registration application utility on the target device.

17. A service provider system, comprising:
a customer service system for receiving registration requests from a target device and gather registration information associated with the target device, the registration information including a preferred content delivery profile for the target device, the preferred content delivery profile including encryption information based on a digital rights management configuration, an optimal resolution, and a bit rate associated with the target device;
a billing system, coupled to the customer service system, for receiving the registration information associated with the target device;
an application repository for storing an application for managing a local identity of the target device, the application repository providing the application for managing the local identity of the target device to the target device to enable the target device to have access to a trusted network including a content source device; and
a profile manager for receiving the registration information and generating profile information associated with the target device;
wherein, in response to the target device selecting content for streaming from the content source device that stores content in an encrypted state, the profile manager provides the profile information including the preferred content delivery profile to the content source device and wherein the content source device, based on the preferred content delivery profile, decrypts and encapsulates the selected content with a digital rights management wrapper using the encryption information to provide the selected content to the target device for streaming according to the preferred content delivery profile.

18. The service provider system of claim 17, wherein the customer service system provides instructions to the target device for accessing and installing on the target device the application for managing the local identity of the target device stored by the application repository.

19. A method for providing content to a device according to a profile of the device, comprising:
storing a plurality of content in an encrypted state;
receiving, from a profile management system, registration information for a target device including a preferred content delivery profile for the target device, the preferred content delivery profile including encryption information based on a digital rights management configuration, an optimal resolution, and a bit rate associated with the target device;
upon receiving a request from the target device, performing authentication of the target device;
upon authentication of the target device, establishing a connection within a trusted network to the target device;
receiving a content streaming request from the target device, the content streaming request comprising a selection of content from the plurality of content; and
based on the preferred content delivery profile, decrypting and encapsulating the selected content with a digital rights management wrapper using the encryption information to provide the selected content to the target device for streaming according to the preferred content delivery profile.

20. The method of claim 19, further comprising confirming authentication of the target device requesting content by matching the requesting target device with data stored in a local database, wherein the data includes the registration information for the target device.

21. The method of claim 19, further comprising receiving a termination message from the target device once the target device ceases consuming the requested content and terminating the streaming of the requested content to save bandwidth and local processing resources.

22. A content source device for providing content to a device according to a profile of the device, comprising:
a memory for storing data including a plurality of encrypted content; and
a processor, coupled to the memory, the processor:
receiving a request for access to the stored content from a target device,
receiving, from a profile management system, registration information for the target device including a preferred content delivery profile for the target device, the preferred content delivery profile including encryption information based on a digital rights management configuration, an optimal resolution, and a bit rate associated with the target device;
performing authentication of the target device using the received registration information;
upon authentication of the target device, establishing a connection to the target device within a trusted network to enable the target device access to the stored content; and
in response to receiving a request from the target device comprising a selection of content from the stored content and based on the preferred content delivery profile, decrypting and encapsulating the selected content with a digital rights management wrapper using the encryption information to provide the selected content to the target device for streaming according to the preferred content delivery profile.

23. The content source device of claim 22, wherein the processor confirms authentication of the target device requesting content by matching the requesting target device with data stored in a local database, wherein the data includes the received registration information for the target device.

24. The content source device of claim 22, wherein the processor receives a termination message from the target device once the target device ceases consuming the requested content and terminates the streaming of the requested content to save bandwidth and local processing resources.

25. A method of providing content from a source device to a target device using a trusted domain, comprising:
    registering a target device to create a preferred content delivery profile for the target device and to establish a trusted domain between the target device and a source device storing content in an encrypted state, the preferred content delivery profile including encryption information based on a digital rights management configuration, an optimal resolution, and a bit rate associated with the target device;
    providing a guide interface on the target device to navigate through the content from the source device;
    requesting at the source device, by the target device, content from the source device;
    initiating an authentication process at the source device;
    accessing, by the source device, a profile manager for identifying the target device, for authenticating the target device, and for identifying the preferred content delivery profile; and
    based on the preferred content delivery profile, decrypting and encapsulating the selected content with a digital rights management wrapper using the encryption information to provide the selected content to the target device for streaming according to the preferred content delivery profile.

26. The method of claim 25, further comprises transcoding the requested content according to the preferred content delivery profile of the target device.

27. The method of claim 25, wherein providing authentication by the profile manager to the source device further comprises verifying that the target device is registered and has permissions to communicate with the source device.

28. The method of claim 25, further comprising recording content at the source device while streaming the recording content to the target device.

29. The method of claim 25, wherein requesting content from the source device by the target device comprises requesting live content being received by the source device, the live content being transcoded by the source device in real time according to the preferred content delivery profile.

30. The method of claim 25, further comprising storing content at a headend and providing the content from the headend to the source device for streaming to the target device upon request by the target device.

31. The method of claim 25, further comprising storing requested content at the source device configured as terminal equipment, transcoding the content according to the preferred content delivery profile, and transmitting the transcoded content from a headend to the target device.

* * * * *